United States Patent
Reddy

(10) Patent No.: US 9,617,460 B2
(45) Date of Patent: Apr. 11, 2017

(54) MAGNESIUM CHLORIDE IN ALCOHOLIC SOLVENT FOR SOREL CEMENT

(71) Applicant: Halliburton Energy Services, Inc., Houston, TX (US)

(72) Inventor: B. Raghava Reddy, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 995 days.

(21) Appl. No.: 13/622,006

(22) Filed: Sep. 18, 2012

(65) Prior Publication Data

US 2014/0076561 A1 Mar. 20, 2014

(51) Int. Cl.
C04B 9/02 (2006.01)
C09K 8/46 (2006.01)
C04B 28/32 (2006.01)

(52) U.S. Cl.
CPC ............. *C09K 8/46* (2013.01); *C04B 28/32* (2013.01)

(58) Field of Classification Search
CPC .............. C04B 9/02; C04B 9/04; C04B 16/00
USPC ........................................ 166/292, 293, 294
See application file for complete search history.

(56) References Cited

U.S. PATENT DOCUMENTS

| | | | |
|---|---|---|---|
| 4,174,229 A | 11/1979 | Boberski et al. | |
| 5,220,960 A | 6/1993 | Totten et al. | |
| 5,226,961 A | 7/1993 | Nahm et al. | |
| 5,298,069 A * | 3/1994 | King | C04B 28/32 106/686 |
| 6,616,751 B1 | 9/2003 | Maroy et al. | |
| 7,044,222 B2 | 5/2006 | Tomlinson | |
| 7,350,575 B1 * | 4/2008 | Lewis | C04B 28/32 166/293 |
| 7,431,086 B2 | 10/2008 | Lewis et al. | |
| 7,763,572 B2 | 7/2010 | Lewis et al. | |
| 7,893,011 B2 | 2/2011 | Lewis et al. | |
| 2010/0006288 A1 * | 1/2010 | Santra | C04B 28/32 166/292 |

OTHER PUBLICATIONS

Hewlett. Lea's Chemistry of Cement and Concrete Fourth Edition, pp. 813-820: 1998: Elsevier Publishing.
Office Action issued in related Canadian patent application No. 2816126, mailed Nov. 30, 2015 (4 pages).
Definition of "Carbonate", Encyclopedia Britannica, found at https://www.britannica.com/science/carbonate (1 page).
Compound Summary entitled "Magnesium Carbonate Hydroxide," PubChem, U.S. National Library of Medicine, National Center for Biotechnology Information, 10 pages.

* cited by examiner

*Primary Examiner* — Doug Hutton, Jr.
*Assistant Examiner* — Ashish Varma
(74) *Attorney, Agent, or Firm* — Craig Roddy; Baker Botts L.L.P.

(57) ABSTRACT

A non-hydraulic cement composition including: (i) a non-aqueous liquid phase comprising one or more organic compounds characterized by: (a) having at least one hydroxyl group on a carbon atom, (b) being a liquid when pure under Standard Laboratory Conditions, and (c) being at least soluble in water; (ii) one or more magnesium chloride compounds selected from the group consisting of: magnesium chloride, a magnesium chloride hydrate, and any combination thereof; and (iii) magnesium oxide; wherein the one or more organic compounds comprise at least 40% by weight of the non-aqueous liquid phase excluding the weight of any dissolved solids. A method of treating a well including the steps of: (A) forming the non-hydraulic cement composition; and (B) introducing the non-hydraulic cement composition into the well.

12 Claims, No Drawings

MAGNESIUM CHLORIDE IN ALCOHOLIC SOLVENT FOR SOREL CEMENT

CROSS-REFERENCE TO RELATED APPLICATIONS

Not applicable.

TECHNICAL FIELD

The inventions are in the field of producing crude oil or natural gas from subterranean formations. More specifically, the inventions generally relate to Sorel cement compositions of magnesium oxide and magnesium chloride and methods for controlling fluid loss in a well.

BACKGROUND

To produce oil or gas, a well is drilled into a subterranean formation that is an oil or gas reservoir.

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a well fluid into a well.

Natural resources such as gas, oil, and water in a subterranean formation are usually produced by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. The main objectives of primary cementing operations include zonal isolation to prevent migration of fluids in the annulus, support for the casing or liner string, and protection of the casing string from corrosive formation fluids. Subsequent secondary cementing operations may also be performed. Secondary or remedial cementing operations are performed to repair primary-cementing problems or to treat conditions arising after the wellbore has been constructed.

Oil or gas in the subterranean formation may be produced by driving fluid into the well using, for example, a pressure gradient that exists between the formation and the wellbore, the force of gravity, displacement of the fluid using a pump or the force of another fluid injected into the well or an adjacent well. The production of fluid in the formation may be increased by hydraulically fracturing the formation. That is, a viscous fracturing fluid may be pumped down the casing to the formation at a rate and a pressure sufficient to form fractures that extend into the formation, providing additional pathways through which the oil or gas can flow to the well.

Fluids used in drilling, completion, or servicing of a wellbore can be lost to the subterranean formation while circulating the fluids in the wellbore. In particular, the fluids may enter the subterranean formation via depleted zones, zones of relatively low pressure, lost circulation zones having naturally occurring fractures, weak zones having fracture gradients exceeded by the hydrostatic pressure of the drilling fluid, and so forth. The extent of fluid losses to the formation may range from minor (for example less than 10 bbl/hr) referred to as seepage loss to severe (for example, greater than 500 bbl/hr) referred to as complete loss. As a result, the service provided by such fluid is more difficult to achieve. For example, a drilling fluid may be lost to the formation, resulting in the circulation of the fluid in the wellbore being too low to allow for further drilling of the wellbore. Also, a secondary cement or sealant composition may be lost to the formation as it is being placed in the wellbore, thereby rendering the secondary operation ineffective in maintaining isolation of the formation.

Lost circulation treatments involving various plugging materials such as walnut hulls, mica, and cellophane have been used to prevent or lessen the loss of fluids from wellbores. The disadvantages of such treatments include the potential for damage to subterranean formations as a result of the inability to remove the plugging materials and the dislodgement of the plugging materials from highly permeable zones whereby fluid losses subsequently resume.

One technique for preventing lost circulation problems has been to temporarily plug voids or permeable zones with Sorel cement compositions. Sorel cement compositions typically comprise magnesium oxide, a magnesium chloride salt, and water, which together form, for example, magnesium oxychloride hydrate. Sorel cements can be removed, if desired, with minimal damage to subterranean zones or formations by dissolution in acids.

Sorel cement use has been limited, however, by the fact that formations that are sensitive to water, such as those containing swelling clay or shale, cannot be exposed to water-based wellbore servicing fluids such as a Sorel cement slurry because of the potential for sloughing of the formation material into the wellbore. Consequently, such wellbores are typically drilled with oleaginous fluids such as oil-based drilling fluids.

In addition, the commercialization efforts for such Sorel cement compositions have been hampered by the settling of magnesium chloride suspended in an oil-based fluid before reaching the well site or while sitting at the well site prior to use. For the Sorel cement composition to set, the magnesium oxide, magnesium chloride, and water need to be combined within a particular range of weight or molar ratios. Settling of one of the components causes the reactants to be present in non-stoichiometric amounts, thereby preventing proper setting of the composition.

It would be desirable to develop Sorel cement compositions that are based on non-aqueous carrier fluids, compatible with oleaginous fluids, that are stable to storage without settling of the magnesium chloride, and that then begin to set when exposed to an aqueous fluid in the well.

SUMMARY OF THE INVENTION

The invention provides a non-hydraulic cement composition including: (i) a non-aqueous liquid phase comprising one or more organic compounds characterized by: (a) having at least one hydroxyl group on a carbon atom, (b) being a liquid when pure under Standard Laboratory Conditions, and (c) being at least soluble in water; (ii) one or more magnesium chloride compounds selected from the group consisting of: magnesium chloride, a magnesium chloride hydrate, and any combination thereof solubilized in the non-aqueous liquid phase; and (iii) magnesium oxide; wherein the one or more organic compounds comprise at least 40% by weight of the non-aqueous liquid phase excluding the weight of any dissolved solids.

In addition, the invention provides a method of treating a well including the steps of: (A) forming the non-hydraulic cement composition; and (B) introducing the non-hydraulic cement composition into the well.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

DETAILED DESCRIPTION OF PRESENTLY PREFERRED EMBODIMENTS AND BEST MODE

Definitions and Usages

Interpretation

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Oil and Gas Reservoirs

In the context of a well fluid, "oil" is understood to refer to an oleaginous liquid, whereas "gas" is understood to refer to a physical state of a substance (in contrast to a liquid). In the context of production from a well, however, "oil" and "gas" are understood to refer to crude oil and natural gas, respectively. Oil and gas are naturally occurring hydrocarbons in certain subterranean formations.

A "subterranean formation" is a body of rock that has sufficiently distinctive characteristics and is sufficiently continuous for geologists to describe, map, and name it.

A subterranean formation having a sufficient porosity and permeability to store and transmit fluids is sometimes referred to as a "reservoir." The vast majority of reservoir rocks are sedimentary rocks, but highly fractured igneous and metamorphic rocks sometimes contain substantial reservoirs as well.

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

Well Terms

A "well" includes a wellhead and at least one wellbore from the wellhead penetrating the earth. The "wellhead" is the surface termination of a wellbore, which surface may be on land or on a seabed. A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well or any other tubulars in the well. The "borehole" usually refers to the inside wellbore wall, that is, the rock surface or wall that bounds the drilled hole.

A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

A wellbore can be used as a production or injection wellbore. A production wellbore is used to produce hydrocarbons from the reservoir. An injection wellbore is used to inject a fluid, e.g., liquid water or steam, to drive oil or gas to a production wellbore.

As used herein, introducing "into a well" means introduced at least into and through the wellhead. According to various techniques known in the art, tubulars, equipment, tools, or well fluids can be directed from the wellhead into any desired portion of the wellbore.

As used herein, the word "tubular" means any kind of body in the general form of a tube. Examples of tubulars include, but are not limited to, a drill pipe, a casing, a tubing string, a line pipe, and a transportation pipe. Tubulars can also be used to transport fluids such as oil, gas, water, liquefied methane, coolants, and heated fluids into or out of a subterranean formation. For example, a tubular can be placed underground to transport produced hydrocarbons or water from a subterranean formation to another location.

As used herein, the term "annulus" means the space between two generally cylindrical objects, one inside the other. The cylindrical objects can be concentric or eccentric. Without limitation, one of the objects can be a tubular and the other object can be an enclosed conduit. The enclosed conduit can be a wellbore or borehole or it can be another tubular. The following are some non-limiting examples illustrate some situations in which an annulus can exist. Referring to an oil, gas, or water well, in an open hole well, the space between the outside of a tubing string and the borehole of the wellbore is an annulus. In a cased hole, the space between the outside of the casing and the borehole is an annulus. In addition, in a cased hole there may be an annulus between the outside cylindrical portion of a tubular such as a production tubing string and the inside cylindrical portion of the casing. An annulus can be a space through which a fluid can flow or it can be filled with a material or object that blocks fluid flow, such as a packing element.

Unless otherwise clear from the context, as used herein an annulus is a space through which a fluid can flow.

As used herein, a "well fluid" broadly refers to any fluid adapted to be introduced into a well for any purpose. A well fluid can be, for example, a drilling fluid, a cementing composition, a treatment fluid, or a spacer fluid. If a well fluid is to be used in a relatively small volume, for example less than about 200 barrels (about 8,400 US gallons or about 32 m$^3$), it is sometimes referred to as a wash, dump, slug, or pill.

Drilling fluids, also known as drilling muds or simply "muds," are typically classified according to their base fluid (that is, the continuous phase). A water-based mud ("WBM") has solid particulate (e.g., cuttings) suspended in an aqueous liquid as the continuous phase. The water can be brine. A brine-based drilling fluid is a water-based mud in which the aqueous component is brine. In some cases, oil may be emulsified in a water-based drilling mud. An oil-based mud ("OBM") has solid particulate suspended in oil as the continuous phase. In some cases, an aqueous phase of water or brine is emulsified in the oil.

As used herein, the word "treatment" refers to any treatment for changing a condition of a portion of a wellbore or an adjacent subterranean formation; however, the word "treatment" does not necessarily imply any particular treatment purpose. A treatment usually involves introducing a well fluid for the treatment, in which case it may be referred to as a treatment fluid, into a well. As used herein, a "treatment fluid" is a fluid used in a treatment. The word "treatment" in the term "treatment fluid" does not necessarily imply any particular treatment or action by the fluid.

A zone refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." A "treatment zone" refers to an interval of rock along a wellbore into which a well fluid is directed to flow from the wellbore. As used herein, "into a treatment zone" means into and through the wellhead and, additionally, through the wellbore and into the treatment zone.

As used herein, a downhole fluid is an in-situ fluid in a well, which may be the same as a well fluid at the time it is introduced, or a well fluid mixed with another other fluid downhole, or a fluid in which chemical reactions are occurring or have occurred in-situ downhole.

Generally, the greater the depth of the formation, the higher the static temperature and pressure of the formation. Initially, the static pressure equals the initial pressure in the formation before production. After production begins, the static pressure approaches the average reservoir pressure.

A "design" refers to the estimate or measure of one or more parameters planned or expected for a particular well fluid or stage of a well service. For example, a fluid can be designed to have components that provide a minimum viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment at the time of a well treatment. That is, design temperature takes into account not only the bottom hole static temperature ("BHST"), but also the effect of the temperature of the well fluid on the BHST during treatment. The design temperature is sometimes referred to as the bottom hole circulation temperature ("BHCT"). Because treatment fluids may be considerably cooler than BHST, the difference between the two temperatures can be quite large. Ultimately, if left undisturbed, a subterranean formation will return to the BHST.

Physical States and Phases

The common physical states of matter include solid, liquid, and gas. A solid has a fixed shape and volume, a liquid has a fixed volume and conforms to the shape of a container, and a gas disperses and conforms to the shape of a container. Distinctions among these physical states are based on differences in intermolecular attractions. Solid is the state in which intermolecular attractions keep the molecules in fixed spatial relationships. Liquid is the state in which intermolecular attractions keep molecules in proximity (low tendency to disperse), but do not keep the molecules in fixed relationships. Gas is that state in which the molecules are comparatively separated and intermolecular attractions have relatively little effect on their respective motions (high tendency to disperse).

As used herein, "phase" is used to refer to a substance having a chemical composition and physical state that is distinguishable from an adjacent phase of a substance having a different chemical composition or a different physical state.

As used herein, if not other otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

Particles and Particulates

As used herein, a "particle" refers to a body having a finite mass and sufficient cohesion such that it can be considered as an entity but having relatively small dimensions. A particle can be of any size ranging from molecular scale to macroscopic, depending on context.

A particle can be in any physical state. For example, a particle of a substance in a solid state can be as small as a few molecules on the scale of nanometers up to a large particle on the scale of a few millimeters, such as large grains of sand. Similarly, a particle of a substance in a liquid state can be as small as a few molecules on the scale of nanometers up to a large drop on the scale of a few millimeters. A particle of a substance in a gas state is a single atom or molecule that is separated from other atoms or molecules such that intermolecular attractions have relatively little effect on their respective motions.

As used herein, "particulate" or "particulate material" refers to matter in the physical form of distinct particles in a solid or liquid state (which means such an association of a few atoms or molecules). As used herein, a particulate is a grouping of particles having similar chemical composition and particle size ranges anywhere in the range of about 1 micrometer (micron) (e.g., microscopic clay or silt particles) to about 3 millimeters (e.g., large grains of sand).

A particulate can be of solid or liquid particles. As used herein, however, unless the context otherwise requires, particulate refers to a solid particulate. Of course, a solid particulate is a particulate of particles that are in the solid physical state, that is, the constituent atoms, ions, or molecules are sufficiently restricted in their relative movement to result in a fixed shape for each of the particles.

It should be understood that the terms "particle" and "particulate," includes all known shapes of particles including substantially rounded, spherical, oblong, ellipsoid, rodlike, fiber, polyhedral (such as cubic materials), etc., and mixtures thereof. For example, the term "particulate" as used herein is intended to include solid particles having the physical shape of platelets, shavings, flakes, ribbons, rods, strips, spheroids, toroids, pellets, tablets or any other physical shape.

A particulate will have a particle size distribution ("PSD"). As used herein, "the size" of a particulate can be determined by methods known to persons skilled in the art.

One way to measure the approximate particle size distribution of a solid particulate is with graded screens. A solid particulate material will pass through some specific mesh (that is, have a maximum size; larger pieces will not fit through this mesh) but will be retained by some specific tighter mesh (that is, a minimum size; pieces smaller than this will pass through the mesh). This type of description establishes a range of particle sizes. A "+" before the mesh size indicates the particles are retained by the sieve, while a "−" before the mesh size indicates the particles pass through the sieve. For example, −70/+140 means that 90% or more of the particles will have mesh sizes between the two values.

Particulate materials are sometimes described by a single mesh size, for example, 100 U.S. Standard mesh. If not otherwise stated, a reference to a single particle size means about the mid-point of the industry-accepted mesh size range for the particulate.

Dispersions

A dispersion is a system in which particles of a substance of one chemical composition and physical state are dispersed in another substance of a different chemical composition or physical state. In addition, phases can be nested. If a substance has more than one phase, the most external phase is referred to as the continuous phase of the substance as a whole, regardless of the number of different internal phases or nested phases.

A dispersion can be classified different ways, including, for example, based on the size of the dispersed particles, the uniformity or lack of uniformity of the dispersion, and, if a fluid, whether or not precipitation occurs.

A dispersion is considered to be heterogeneous if the dispersed particles are not dissolved and are greater than about 1 nanometer in size. (For reference, the diameter of a molecule of toluene is about 1 nm).

Heterogeneous dispersions can have gas, liquid, or solid as an external phase. For example, in a case where the dispersed-phase particles are liquid in an external phase that is another liquid, this kind of heterogeneous dispersion is more particularly referred to as an emulsion. A solid dispersed phase in a continuous liquid phase is referred to as a sol, suspension, or slurry, partly depending on the size of the dispersed solid particulate.

A dispersion is considered to be homogeneous if the dispersed particles are dissolved in solution or the particles are less than about 1 nanometer in size. Even if not dissolved, a dispersion is considered to be homogeneous if the dispersed particles are less than about 1 nanometer in size.

Heterogeneous dispersions can be further classified based on the dispersed particle size.

A heterogeneous dispersion is a "suspension" where the dispersed particles are larger than about 50 micrometers. Such particles can be seen with a microscope, or if larger than about 50 micrometers (0.05 mm), with the unaided human eye. The dispersed particles of a suspension in a liquid external phase may eventually separate on standing, e.g., settle in cases where the particles have a higher density than the liquid phase. Suspensions having a liquid external phase are essentially unstable from a thermodynamic point of view; however, they can be kinetically stable over a long period depending on temperature and other conditions.

A heterogeneous dispersion is a "colloid" where the dispersed particles range up to about 50 micrometer (50,000 nanometers) in size. The dispersed particles of a colloid are so small that they settle extremely slowly, if ever. In some cases, a colloid can be considered as a homogeneous mixture. This is because the distinction between "dissolved" and "particulate" matter can be sometimes a matter of theoretical approach, which affects whether or not it is considered homogeneous or heterogeneous.

A solution is a special type of homogeneous mixture. A solution is considered homogeneous: (a) because the ratio of solute to solvent is the same throughout the solution; and (b) because solute will never settle out of solution, even under powerful centrifugation, which is due to intermolecular attraction between the solvent and the solute. An aqueous solution, for example, saltwater, is a homogenous solution in which water is the solvent and salt is the solute.

One may also refer to the solvated state, in which a solute ion or molecule is complexed by solvent molecules. A chemical that is dissolved in solution is in a solvated state. The solvated state is distinct from dissolution and solubility. Dissolution is a kinetic process, and is quantified by its rate. Solubility quantifies the concentration of the solute at which there is dynamic equilibrium between the rate of dissolution and the rate of precipitation of the solute. Dissolution and solubility can be dependent on temperature and pressure, and may be dependent on other factors, such as salinity or pH of an aqueous phase.

Solubility

A substance is considered to be "soluble" in a liquid if at least 10 grams of the substance can be dissolved in one liter of the liquid when tested at 77° F. and 1 atmosphere pressure for 2 hours and considered to be "insoluble" if less than 1 gram per liter soluble and "sparingly soluble" for intermediate solubility values.

As will be appreciated by a person of skill in the art, the hydratability, dispersibility, or solubility of a substance in water can be dependent on the salinity, pH, or other substances in the water. Accordingly, the salinity, pH, and additive selection of the water can be modified to facilitate the hydratability, dispersibility, or solubility of a substance in aqueous solution. To the extent not specified, the hydratability, dispersibility, or solubility of a substance in water is determined in deionized water, at neutral pH, and without any other additives.

As used herein, the term "polar" means having a dielectric constant greater than 30. The term "relatively polar" means having a dielectric constant greater than about 2 and less than about 30. "Non-polar" means having a dielectric constant less than 2.

As used herein, a "mutual solvent" is a chemical that is soluble both oil and water. An example of a mutual solvent is ethylene glycol monobutyl ether, also known as "EGMBE."

Fluids

A fluid can be a single phase or a dispersion. In general, a fluid is an amorphous substance that is or has a continuous phase of particles that are smaller than about 1 micrometer that tends to flow and to conform to the outline of its container.

Examples of fluids are gases and liquids. A gas (in the sense of a physical state) refers to an amorphous substance that has a high tendency to disperse (at the molecular level) and a relatively high compressibility. A liquid refers to an amorphous substance that has little tendency to disperse (at the molecular level) and relatively high incompressibility. The tendency to disperse is related to Intermolecular Forces (also known as van der Waal's Forces). (A continuous mass of a particulate, e.g., a powder or sand, can tend to flow as a fluid depending on many factors such as particle size distribution, particle shape distribution, the proportion and nature of any wetting liquid or other surface coating on the particles, and many other variables. Nevertheless, as used herein, a fluid does not refer to a continuous mass of particulate as the sizes of the solid particles of a mass of a particulate are too large to be appreciably affected by the range of Intermolecular Forces.)

As used herein, a fluid is a substance that behaves as a fluid under Standard Laboratory Conditions, that is, at 77° F. (25° C.) temperature and 1 atmosphere pressure, and at the higher temperatures and pressures usually occurring in subterranean formations without applied shear.

Every fluid inherently has at least a continuous phase. A fluid can have more than one phase. The continuous phase of a well fluid is a liquid under Standard Laboratory Conditions. For example, a well fluid can be in the form of be a suspension (solid particles dispersed in a liquid phase), an emulsion (liquid particles dispersed in another liquid phase), or a foam (a gas phase dispersed in a liquid phase).

As used herein, a water-based fluid means that water or an aqueous solution is the dominant material of the continuous phase, that is, greater than 50% by weight, of the continuous phase of the substance based on the combined weight of water and any other liquids in the phase (for example, excluding the weight of any dissolved solids).

In contrast, "oil-based" means that oil is the dominant material by weight of the continuous phase of the substance based on the combined weight of oil any other liquids in the phase (for example, excluding the weight of any dissolved solids). In this context, the oil of an oil-based fluid can be any oil. In general, oil is any substance that is liquid under Standard Laboratory Conditions, is hydrophobic, and soluble in organic solvents. Oils have a high carbon and hydrogen content and are relatively non-polar substances. This general definition includes classes such as petrochemical oils, vegetable oils, and many organic solvents. All oils can be traced back to organic sources.

As used herein, "compatibility" of two different fluids with each other that when mixed there is no fluid separation or precipitation of solids.

As used herein, a "non-aqueous" liquid phase means a liquid phase that comprises less than 5% water by weight based on the combined weight with one or more other liquids in the phase excluding the weight of any dissolved solids.

Cement Compositions

In the most general sense of the word, a "cement" is a binder, that is, a substance that sets and can bind other materials together. As used herein, "cement" refers to inorganic cement (as opposed to organic cement and adhesives). When the cement is mixed with water, it will begin to set and harden.

As used herein, a "cement composition" is a material including at least one inorganic cement. A cement composition can also include additives. A cement composition can include water or be mixed with water. Depending on the type of cement, the chemical proportions, when a cement composition is mixed with water it can begin setting to form a single phase solid material.

A cement can be characterized as non-hydraulic or hydraulic.

Non-hydraulic cements (e.g., gypsum plaster, Sorel cements) harden because of hydration, but too much water cannot be present, and the set material must be kept dry in order to retain integrity and strength. A non-hydraulic cement produces hydrates that are not resistant to water. If the proportion of water to a non-hydraulic cement is too high, the cement composition will not set into a hardened material.

Hydraulic cements (e.g., Portland cement) harden because of hydration, chemical reactions that occur independently of the mixture's water content; they can harden even underwater or when constantly exposed to wet weather. The chemical reaction that results when the dry cement powder is mixed with water produces hydrates that have extremely low solubility in water.

Cementing and Other Uses for Cement Compositions

It is common to introduce a cement composition into an annulus in the wellbore. For example, in a cased hole, the cement composition is placed into and allowed to set in the annulus between the wellbore and the casing in order to stabilize and secure the casing in the wellbore. After setting, the set cement composition should have a low permeability. Consequently, oil or gas can be produced in a controlled manner by directing the flow of oil or gas through the casing and into the wellhead. Cement compositions can also be used, for example, in well-plugging operations. Cement compositions can also be used to control fluid loss or migration in zones.

During placement of a cement composition, it is necessary for the cement composition to remain pumpable during introduction into the subterranean formation or the well and until the cement composition is situated in the portion of the subterranean formation or the well to be cemented. After the cement composition has reached the portion of the well to be cemented, the cement composition ultimately sets. A cement composition that thickens too quickly while being pumped can damage pumping equipment or block tubing or pipes, and a cement composition that sets too slowly can cost time and money while waiting for the cement composition to set.

Pumping Time and Thickening Time

As used herein, the "pumping time" is the total time required for pumping a cementing composition into a desired portion or zone of the well plus a safety factor.

As used herein, the "thickening time" is how long it takes for a cement composition to become unpumpable at a specified temperature and specified pressure. The pumpability of a cement composition is related to the consistency of the composition. The consistency of a cement composition is measured in Bearden units of consistency (Bc), a dimensionless unit with no direct conversion factor to the more common units of viscosity. As used herein, a cement composition becomes unpumpable when the consistency of the composition reaches 70 Bc.

As used herein, the consistency of a cement composition is measured according to ANSI/API Recommended Practice 10B-2 as follows. The cement composition is mixed and then placed in the test cell of a High-Temperature, High-Pressure (HTHP) consistometer, such as a Fann Model 275 or a Chandler Model 8240. The cement composition is tested in the HTHP consistometer at the specified temperature and pressure. Consistency measurements are taken continuously until the consistency of the cement composition exceeds 70 Bc.

Of course, the thickening time should be greater than the pumping time for a cementing operation.

Setting and Compressive Strength

As used herein, the term "set" is intended to mean the process of becoming hard or solid by curing. Depending on the composition and the conditions, it can take just a few minutes up to 72 hours or longer for some cement compositions to initially set. A cement composition sample that is at least initially set is suitable for destructive compressive strength testing.

Compressive strength is defined as the capacity of a material to withstand axially directed pushing forces. The compressive strength a cement formation attains is a function of both curing time and temperature.

The compressive strength of a cement composition can be used to indicate whether the cement composition has set. As used herein, a cement composition is considered "initially set" when the cement composition has developed a compressive strength of 50 psi using the non-destructive compressive strength method. As used herein, the "initial setting time" is the difference in time between when the cement is mixed with water and when the cement composition is initially set. Some cement compositions can continue to develop a compressive strength greater than 50 psi over the course of several days. The compressive strength of certain kinds of cement compositions can reach over 10,000 psi.

Compressive strength is generally measured at a specified time after the cement composition has been mixed and at a specified temperature and pressure conditions. If not otherwise stated, the setting and the initial setting time is determined at a design temperature and an atmospheric pressure of 3,000 psi. Compressive strength can also be measured at a specific time and temperature after the cement composition has been mixed, for example, in the range of about 24 to about 72 hours at a design temperature and 3,000 psi. According to ANSI/API Recommended Practice 10B-2, compressive strength can be measured by either a destructive method or non-destructive method.

The destructive method mechanically tests the strength of cement composition samples at various points in time by crushing the samples in a compression-testing machine. The destructive method is performed as follows. The cement composition is mixed and then cured. The cured cement composition sample is placed in a compressive strength testing device, such as a Super L Universal testing machine model 602, available from Tinius Olsen, Horsham in Pennsylvania, USA. According to the destructive method, the compressive strength is calculated as the force required to break the sample divided by the smallest cross-sectional area in contact with the load-bearing plates of the compression device. The actual compressive strength is reported in units of pressure, such as pound-force per square inch (psi) or megapascals (MPa).

The non-destructive method continually measures a correlated compressive strength of a cement composition sample throughout the test period by utilizing a non-destructive sonic device such as an Ultrasonic Cement Analyzer (UCA) available from Fann Instruments in Houston, Tex. As used herein, the "compressive strength" of a cement composition is measured utilizing an Ultrasonic Cement Analyzer as follows. The cement composition is mixed. The cement composition is placed in an Ultrasonic Cement Analyzer, in which the cement composition is heated to the specified temperature and pressurized to the specified pressure. The UCA continually measures the transit time of the acoustic signal through the sample. The UCA device contains preset algorithms that correlate transit time through the sample to compressive strength. The UCA reports the compressive strength of the cement composition in units of pressure, such as psi or megapascals (MPa).

After the cement composition has set in the portion of the well to be cemented, the composition preferably has a low permeability.

Cement Retarders

As used herein, a "retarder" is a chemical agent used to increase the thickening time of a cement composition. The need for retarding the thickening time of a cement composition tends to increase with depth of the zone to be cemented due to the greater time required to complete the cementing operation and the effect of increased temperature on the setting of the cement. A longer thickening time at the design temperature allows for a longer pumping time that may be required.

General Measurement Terms

Unless otherwise specified or unless the context otherwise clearly requires, any ratio or percentage means by weight.

If there is any difference between U.S. or Imperial units, U.S. units are intended. For example, "gal/Mgal" means U.S. gallons per thousand U.S. gallons.

Unless otherwise specified, mesh sizes are in U.S. Standard Mesh.

The micrometer (μm) may sometimes be referred to herein as a micron.

General Description Of The Invention

The purpose of the invention is to prevent the settling of magnesium chloride in a non-aqueous Sorel cement composition, which can be used in a well.

Magnesium chloride is typically used in the form of solid flakes with dimensions ranging from about 1 mm×1 mm to about 5 mm×5 mm, although other particle sizes can be used. The other component is magnesium oxide powder which is finely divided (micron size) and suspends fairly well in the non-aqueous carrier fluid.

In the past, the two reactive components of the Sorel cement, preferably along with a filler such as attapulgite, have been slurried in diesel or kerosene, and pumped down the casing of a well or down coiled tubing in a well. The non-aqueous suspension is allowed to be exposed to an aqueous fluid in the well, such as water or a water-based well fluid pumped down the annulus. The flow rates are adjusted to achieve magnesium chloride, magnesium oxide, and water ratios to achieve a setting of the Sorel cement composition downhole. Preferably, the ratios are adjusted to achieve a maximum possible ultimate strength of the Sorel cement for the composition.

When the two fluids meet, preferably immediate gunk formation takes place, and the gunk ultimately sets under downhole conditions. Gunk is a viscous semi-solid mass that when formed downhole in the flow path of a fluid will offer immediate and significant resistance to penetration by the fluid and thereby prevent its flow. For suitable compositions, the semi-solid mass may ultimately become hardened and develop sufficient strength to plug a flow path of fluid even under increased fluid pressures. An estimate of the quantitative viscosity of a gunk mass is in the range of about 1,000,000 centipoise to about 20,000,000 centipoise.

Currently, most of the applications for Sorel cement technology in the oilfield are for drilling applications, and in some cases for produced water control, although it also has some applications in cementing. For example, this technology can be used to combat lost fluid circulation, which can be especially useful during drilling operations. The Sorel cement suspension can be stored at a well site and used on-the-fly when a loss circulation zone is encountered during drilling.

The commercialization efforts for such Sorel cement compositions have been hampered, however, by the settling of magnesium chloride before reaching the well site or while sitting at the well site prior to use. For the Sorel cement composition to set, the magnesium oxide, magnesium chloride, and water need to present within a particular range of ratios. Settling of one of the components causes the reactants to be present in non-stoichiometric amounts, thereby preventing proper setting of the composition.

According to the invention, a magnesium chloride compound is dissolved in a non-aqueous liquid phase, wherein the non-aqueous liquid phase includes one or more organic compounds having at least one hydroxyl functional group on a carbon atom. In an embodiment, the one or more organic compounds are in a concentration of at least 40% by weight of the non-aqueous liquid phase excluding the weight of any dissolved solids. In an embodiment, the magnesium compound is dissolved in the non-aqueous liquid under ambient conditions, such as room temperature of Standard Laboratory Conditions. The solution combined with magnesium oxide powder can be used as an improved non-aqueous Sorel cement composition. Typically, inorganic salts do not have significant solubility in organic solvents. Magnesium chloride is one of the very few salts that dissolve in solvents containing at least one hydroxyl group. Without being limited by any theory, this is presumably by complex formation with such a solvent.

In an embodiment, the invention provides a non-hydraulic cement composition including: (i) a non-aqueous liquid phase comprising one or more organic compounds characterized by: (a) having at least one hydroxyl group on a carbon atom, (b) being a liquid when pure under Standard Laboratory Conditions, and (c) being at least soluble in water; and (ii) one or more magnesium chloride compounds selected from the group consisting of: magnesium chloride, a magnesium chloride hydrate, and any combination thereof; and (iii) magnesium oxide; wherein the one or more organic compounds comprise at least 40% by weight of the non-aqueous liquid phase excluding the weight of any dissolved solids.

In addition, the invention provides a method of treating a well including the steps of: (A) forming the non-hydraulic cement composition; and (B) introducing the non-hydraulic cement composition into the well. In a further embodiment, the method can include the additional steps of: (C) allowing the composition to be exposed to water downhole in a zone; and (D) allowing the mixture of the composition and water to form a semi-solid viscous mass in the zone; and (E) allowing the semi-solid viscous mass to ultimately set to a solid of measureable compressive strength.

In an embodiment, a non-hydraulic cement composition according to the invention is provided, wherein the one or more magnesium chloride compounds are dissolved in the non-aqueous liquid phase at a concentration of at least 50 g/l based on the volume of the one or more organic compounds in the liquid phase that are characterized by: (a) having at least one hydroxyl group on a carbon atom, (b) being a liquid when pure under Standard Laboratory Conditions, and (c) being at least soluble in water. In an embodiment, the non-aqueous phase is capable of dissolving magnesium chloride or its hydrates.

In an embodiment, the one or more organic compounds are additionally characterized by dissolving magnesium chloride to at least 100 g/l under Standard Laboratory Conditions.

In an embodiment, the non-aqueous liquid phase comprises less than 1% water by weight excluding the weight of any dissolved solids. Preferably, the non-aqueous liquid phase is essentially dry.

In an embodiment, the non-aqueous liquid phase is the continuous phase of the non-hydraulic cement composition. Preferably, the non-hydraulic cement composition is not an emulsion with an aqueous phase.

In an embodiment, the one or more organic compounds are not surfactants. As used herein, a surfactant is capable of forming micelles or bi-layers in the non-aqueous liquid phase. Preferably, the non-aqueous liquid phase comprises less than 0.1% of surfactants by weight based on the combined weight of magnesium chloride compounds and magnesium oxide.

In another embodiment, the non-aqueous liquid phase comprises less than 0.1% surfactants by weight based on the non-aqueous liquid phase.

The Sorel cement composition can optionally be further mixed with other non-aqueous liquids, such as hydrocarbons or esters, if desired, provided that the desired concentration of magnesium chloride compounds remain in solution without precipitation.

In an embodiment, the magnesium oxide is in particulate form. The magnesium oxide is suspended in the non-aqueous liquid phase.

The Sorel cement composition can optionally include a particulate filler material such as attapulgite, fly ash, or slag.

The compositions and methods according to the invention overcome the settling problem of magnesium chloride in non-aqueous Sorel cement compositions, which can be used, for example, in fluid loss control in a well. They can also be used, for example, in shutting off unwanted water or gas production.

The compositions can be environmentally benign and can provide good compressive strengths after setting.

When introduced into a well and mixed with water, while maintaining appropriate ratios of the magnesium chloride, magnesium oxide, and water, the Sorel cement composition can become viscous and then set downhole. The set Sorel cement can later be removed from the well, if desired, by contact with an acidic aqueous fluid.

It should be understood that in an embodiment the treatment fluid does not include hydraulic cement and the treatment fluid is not a hydraulic cement composition. For example, in an embodiment, the non-hydraulic cement composition comprises less than 1% hydraulic cement by weight based on the by combined weight of magnesium chloride compounds and magnesium oxide. Preferably, the non-hydraulic cement composition is essentially free of hydraulic cement or includes no hydraulic cement.

Embodiments Of The Invention

Disclosed herein are well fluids comprising a Sorel cement of magnesium oxide and magnesium chloride in a non-aqueous liquid phase and methods of using same. Such fluids may be placed into a wellbore and allowed to set and form a rigid mass. Each of the components of the wellbore servicing fluid disclosed herein will be described in more detail.

Sorel Cements

Sorel cement (also known as magnesia cement) is a non-hydraulic cement first produced by Stanislas Sorel in 1867. The cement is typically a mixture of magnesium oxide (burnt magnesia) and magnesium chloride that when mixed with water hardens and sets. After setting, a Sorel cement can withstand up to about 12,000 psi of compressive force, whereas standard Portland cement, which is a hydraulic cement, can only withstand about 5,000 psi.

More particularly, without being limited by any theory, it is believed the main products formed in Sorel cements based on magnesium chloride and magnesium oxide include magnesium hydroxide ($Mg(OH)_2$), a 3-form magnesium oxychloride of composition $3Mg(OH)_2 \cdot MgCl_2 \cdot 8H_2O$, and a 5-form magnesium oxychloride product of the composition $5Mg(OH)_2 \cdot MgCl_2 \cdot 8H_2O$. The 5-form product is more preferred product with superior mechanical properties and is primary product formed when the molar ratio of its components are in the ratio $MgO:MgCl_2:H_2O$ equals about 5:1:13 when a slight excess of MgO and an amount of water required to form the 5-form and to convert any excess MgO into $Mg(OH)_2$. For the 3-form, the molar ratio of $MgO:MgCl_2:H_2O$ is 3:1:11.

The reactivity of magnesium oxide and the rates of formation of the 3-form or 5-form products depend on its method of production, surface area, particle porosity, particle sizes, exposure to carbon dioxide, as well as on surface treatments with process aids. The particle size range of magnesium oxide is preferably in the range of 50 nanometers to about 100 microns. Such particles may be pre-coated with organic materials such as fatty acids, for example, stearic acid.

A discussion of various magnesia-based cements can be found, for example, in Lea's Chemistry of Cement and Concrete by Peter Hewlett: Fourth Edition, pages 813-820: 1998: Elsevier Publishing.

In an embodiment, the Sorel cement comprises a metal oxide, preferably an alkaline earth metal oxide, and more preferably magnesium oxide. Magnesium oxide can be prepared by calcination of $Mg(OH)_2$ as shown in Reaction 1:

$$Mg(OH)_2 + Heat \rightarrow MgO + H_2O \qquad \text{(Reaction 1)}$$

The calcination of $Mg(OH)_2$ results in what is commonly referred to as "burned" MgO. Three basic grades of burned MgO are typically produced with the differences between each grade related to the degree of reactivity remaining after being exposed to a range of high temperatures. The original magnesium hydroxide particle is usually a large and loosely bonded particle. Exposure to thermal degradation by calcination causes the $Mg(OH)_2$ to alter its structure so that the surface pores are slowly filled in while the particle edges become more rounded. This results in MgO with varying degrees of crystallinity and consequently varying degrees of reactivity. When the MgO is produced by calcining to temperatures ranging between about 1,500° C. to about 2,000 C. The MgO is referred to as "dead-burned" since the majority of the reactivity has been eliminated. Dead-burned MgO has the highest degree of crystallinity of the three grades of burned MgO. An example of a dead-burned MgO includes without limitation THERMATEK HT™ additive which is commercially available from Halliburton Energy Services. A second type of MgO produced by calcining at temperatures ranging from about 1,000° C. to about 1,500° C. is termed "hard-burned" and displays an intermediate crystallinity and reactivity when compared to the other two grades of burned MgO. An example of a hard-burned MgO includes without limitation THERMATEK LT™ additive which is commercially available from Halliburton Energy Services. The third grade of MgO is produced by calcining at temperatures ranging from about 700° C. to about 1,000° C. and is termed "light-burned" or "caustic" magnesia. Light-burned MgO is characterized by a high surface area, a low crystallinity, and a high degree of reactivity when compared to the other grades of burned MgO. In embodiments, the MgO for use in a Sorel cement comprises hard-burned MgO, light-burned MgO, dead-burned MgO, or combinations thereof.

In an embodiment, the Sorel cement comprises a magnesium chloride compound, preferably magnesium chloride ($MgCl_2$) or magnesium chloride hexahydrate ($MgCl_2 \cdot 6H_2O$). Magnesium chloride hexahydrate is well known and available from a wide variety of sources. For example, a suitable $MgCl_2 \cdot 6H_2O$ for use in this disclosure is C-TEK™ additive commercially available from Halliburton Energy Services.

Examples of Sorel cements comprising MgO (e.g., THERMATEK HT™ additive or THERMATEK LT™ additive) and $MgCl_2 \cdot 6H_2O$ (e.g., C-TEK™ additive) include without limitation THERMATEK™ rigid setting fluids commercially available from Halliburton Energy Services.

In an embodiment, the Sorel cement is formed through contacting magnesium oxide and a magnesium chloride compound present in a non-aqueous fluid with water.

In an embodiment, the ratio of the magnesium oxide to the magnesium chloride compounds is at least 0.5:1 by weight. In a preferred embodiment, the ratio of the magnesium oxide to the magnesium chloride compounds is at least 1:1 by weight. In a preferred embodiment, the ratio of the magnesium oxide to the magnesium chloride compounds is less than 2:1 by weight.

Magnesium chloride is often used in its hexahydrate form. The weight ratio of magnesium oxide to magnesium chloride hexahydrate is preferably around 1:1.7 to 1.7 to 1, with the most preferred weight ratio being about 1:1. In an embodiment, the Sorel cement may comprise MgO and $MgCl_2 \cdot 6H_2O$ present in a ratio of about 2:1 $MgO:MgCl_2 \cdot 6H_2O$, alternatively about 1.5:1 $MgO:MgCl_2 \cdot 6H_2O$ and, alternatively about 1:1 $MgO:MgCl_2 \cdot 6H_2O$.

A "Sorel cement composition" is sometimes referred to herein as "SCC".

In an embodiment, the SCC may comprise a retarder. Retarders can be used to adjust the time required for setting of the slurry. Such retarders may allow the operator to control the set time of the composition based on the geothermal temperature at which the composition will be used. Increasing the weight percentage of the retarder will increase the time required for the composition to undergo the phase transition from a slurry to a set mass with appreciable compressive strength. Retarders suitable for use in this disclosure include without limitation sodium hexametaphosphate (technical grade granular), potassium magnesium phosphate hexahydrate, potassium magnesium hexametaphosphate or combinations thereof. An example of a retarder suitable for use in this disclosure is sodium hexametaphosphate commercially available from Deepearth Solutions under the trademark R-TEK™.

In an embodiment, the thickening time of the SCC may be adjusted through the use of a retarder (e.g., sodium hexametaphosphate) such that the composition remains pumpable during downhole placement before rapidly setting. Retarders can be present in the SCC in a range of from about 0.01% to about 10.0% by weight of the magnesium oxide, alternatively from about 0.1% to about 8%, alternatively from about 0.1% to about 6%.

In some embodiments, additives may be included in the SCC for improving or changing the properties thereof. Examples of such additives include but are not limited to salts, accelerants, viscosifiers, weighting materials, vitrified shale, formation conditioning agents, or combinations thereof. Other mechanical property modifying additives, for example, carbon fibers, glass fibers, metal fibers, minerals fibers, and the like can be added to further modify the mechanical properties. These additives may be included singularly or in combination. Methods for introducing these additives and their effective amounts are known to one of ordinary skill in the art.

Non-Aqueous Organic Solvent

According to the invention, a magnesium chloride compound is dissolved in a non-aqueous liquid phase including an organic compound having at least one hydroxyl functional group on a carbon atom. In an embodiment, the one or more organic compounds are in a concentration of at least 40% by weight of the non-aqueous liquid phase excluding the weight of any dissolved solids.

Suitable examples of organic compounds having at least one hydroxyl function group on a carbon atom include: alcohols, alcohol ethers, and mixtures thereof. Specific examples of these organic compounds that have been found to be effective include:

(a) mono alcohols having less than 7 carbon atoms, such as ethanol and isopropyl alcohol,
(b) glycols (diols) having less than 10 carbon atoms, such as ethylene glycol (IUPAC ethane-1,2-diol),
(c) ether alcohols (which can be made from glycols) having less than 15 carbon atoms, such as diethylene glycol ("DEG", IUPAC (2-hydroxyethoxy)ethan-2-ol), diethylene glycol monomethyl ether (IUPAC 2-(2-methoxyethoxy)ethanol), ethylene glycol monobutyl ether (IUPAC 2-butoxyethanol), propylene glycol monomethyl ether ("PGME", IUPAC 1-methoxy-2-propanol), propylene glycol monopropyl ether ("PGMP", IPUAC 1-propoxy-2-propanol), and
(d) polypropylene glycols having a an average molecular weight less than about 500 gram/mole, for example, PPG400.

Oxygenated solvents containing no hydroxyl groups such as diglyme (diethylene glycol dimethyl ether) did not dissolve magnesium chloride.

More preferably, the organic compound is additionally selected for the property of being miscible with water. All of the above examples of organic compounds that have at least one hydroxyl group on a carbon atom are believed to be miscible with water except for some of the polypropylene glycols, for which the longer the polymer chain, the less soluble in water.

In an embodiment, the Sorel cement composition can optionally include a second non-aqueous liquid. The purpose of the second non-aqueous liquid can be for diluting the organic solvent having at least one hydroxyl group on a carbon atom with a more cost-effective or environmentally preferable fluid system. The second non-aqueous liquid can be a hydrocarbon such as kerosene or diesel.

In preferred embodiments, magnesium chloride solutions of the non-aqueous solvents containing at least one hydroxyl functional group on at least one carbon atom are mixed with suitable amounts of magnesium oxide, and optionally fillers (such as appatulgite), to obtain Sorel cement compositions of desired concentrations and densities. The order of mixing the components of the Sorel cement composition is not critical. The Sorel cement composition can be pumped downhole and allowed to mix with an aqueous fluid at the desired downhole location.

In an embodiment, the Sorel cement composition can optionally include water-repelling agent, such as the sodium salt of trimethyl siliconate. The water repelling agent helps provide the hardened, set Sorel cement some resistance to dissolution or leaching in water, but it is not expected to make a Sorel cement stable to water (which would be like a hydraulic cement).

Solubilities of Magnesium Chloride in Certain Non-Aqueous Solvents

Solubility of magnesium chloride (anhydrous) in a solvent or solvent mixture was experimentally estimated by adding known weights of solid magnesium chloride to a known amount of the solvent under Standard Laboratory Conditions until no additional solid would dissolve. The approximate solubilities of magnesium chloride (anhydrous) flakes measured in various solvents under Standard Laboratory Conditions are shown in Table 1.

TABLE 1

| Solvent | Approximate Solubility (g/l) |
| --- | --- |
| Isopropyl alcohol | 290 |
| Denatured ethanol | 400 |
| Ethylene glycol | 400 |
| Diethylene glycol | 330 |
| Diethylene glycol monomethyl ether | 400 |
| Ethylene glycol monobutyl ether | 290 |
| Ethylene glycol monobutyl ether + hexyl alcohol (50:50) | 330 |
| Propylene glycol monomethyl ether | 400 |
| Propylene glycol monopropyl ether | 100 |
| Polypropylene glycol (PPG 400, i.e., 380-420 g/mol) | 100 |
| 2-methoxyethyl ether (diglyme) | <10 (insoluble) |

According to an embodiment, a solvent or mixture of solvents is selected for which the solubility of magnesium chloride or magnesium chloride hexahydrate is at least 100 g/l.

In an embodiment, the concentration of magnesium chloride, magnesium chloride hexahydrate, or combination thereof is at least 100 g/l in the solvent or mixture of solvents that have at least one hydroxyl group on at least one carbon atom (that is, excluding any other non-aqueous liquid in the solvent mixture).

Screening For Dilution with Diesel and then Gunk Formation with Water Addition

The purpose of screening for including a second non-aqueous liquid in the Sorel cement composition according to the invention is to simulate intentionally diluting with a more cost-effective or environmentally preferable liquid, as well as to simulate the effects of the treatment fluid contacting a different non-aqueous well fluid downhole, such as a spacer pre-flush or post-treatment fluid. Such a non-aqueous well fluid is typically a hydrocarbon fluid such as kerosene or diesel.

Experiments 1 through 8 shown in Table 2 involved a first stage of: (a) dissolving 2 grams magnesium chloride (anhydrous) in a minimum volume of the specified solvent sufficient to dissolve the magnesium chloride with stirring; (b) diluting the solution with diesel such that total volume of the non-aqueous fluid was 12 ml; (c) adding 3.4 grams of magnesium oxide and 2.6 grams of attapulgite and shaking the mixture. Observations made at this stage are listed in Table 2. In the experiments where good or at least promising results (for example, stable dispersions or no phase separation occurred upon dilution) were obtained with the diluted mixtures (Experiments #2, #5, and #6), in a second screening stage, 2.8 ml water was added and stirred with a spatula. In the other experiments (#1, #3, #4, #7, and #8), the second stage of screening was not done. Observations made during these second-stage screening tests are also presented in Table 2.

TABLE 2

| Expt # | Solvent used to dissolve MgCl₂ | Second non-aqueous Fluid | Observations on Non-Aqueous Slurry | Observations upon addition of water |
|---|---|---|---|---|
| 1 | Diethylene glycol monomethyl ether | Diesel | Solid gunk formation with fluid separation. | Not done |
| 2 | Ethylene glycol monobutyl ether | Diesel | Excellent solids dispersion | Excellent gunk formation |
| 3 | Denatured ethanol | Diesel | Two fluid layer formation with solid gunk formation | Not done |
| 4 | Isopropyl alcohol | Diesel | Two fluid layer formation with well dispersed solids | Not done |
| 5 | Propylene glycol monomethyl ether | Diesel | Two fluid layer separation with gunk formation | No gunk formation-thin slurry |
| 6 | Ethylene glycol monobutyl ether + hexyl alcohol | Diesel | Good solid dispersion. No fluid layer separation | Good gunk formation |
| 7 | Diethylene glycol | None | Gunk formed upon addition of MgO and attapulgite | Not done |
| 8 | Ethylene glycol | Diesel | Solid gunk formation with two fluid layer separation | Not done |

The results in Table 2 show that when the polarity difference between the organic solvent(s) having a hydroxyl group and the diesel is higher, a fluid separation can be expected. However, a solvent with intermediate polarity, particularly the solvents with mono-butylated ethylene glycol, the fluids were more compatible and neither fluid layer separation, nor solids clumping ("gunking") was observed. The above results also indicate which solvents may be more preferable for use in a Sorel cement composition in certain well contexts, depending on the other fluids present, even though other solvents are otherwise effective solvents for magnesium chloride. Thus for example, diethylene glycol, even though effective in dissolving magnesium chloride, was not effective in providing a good solid dispersion when mixed with magnesium oxide and attapulgite. The above study suggested that ethylene glycol monobutyl ether is a good solvent for magnesium chloride and is compatible with other non-aqueous fluids and the solids.

Screening for Relative Cement Compressive Strengths after Water Addition

The next study focused on the qualitative screening of the relative strengths of the Sorel cement compositions when different solvents are used. This is important because the type of non-aqueous fluids used help define the integrity (matrix continuity) of the reaction product between magnesium chloride, magnesium oxide, and water.

A stock solution of magnesium chloride in ethylene glycol monobutyl ether was prepared and mixed separately with equal volumes of each of the specified solvents in the list below such that the ratio of the solid components (before dissolving the magnesium chloride) is identical to that described above in Experiments 1 through 8 of Table 1, that is, a ratio of 2 grams magnesium chloride to 3.4 grams of magnesium oxide to 2.6 grams of attapulgite. All the formulations were well suspended and there was no separation of fluids. To each mixture, water was added and stirred. The samples were kept in an oven at 140° F. for 48 hrs. The solids were tested for their strength by their resistance to penetration by a spatula. The following trend was noted for strength (from highest to lowest strength): Propylene glycol monomethyl ether~ethylene glycol>ethanol~diethylene glycol~diethylene glycol monomethyl ether>isopropyl alcohol~ethylene glycol monobutyl ether~ethylene glycol monobutyl ether and hexyl alcohol (50:50).

The above results indicate that for highest compressive strengths, alcoholic solvents with relatively higher O/C ratios are preferred, for example ethylene glycol. However, for compatibility with low and high polarity fluids, for example diesel and water, mutual solvents may need to be present in the composition.

Quantitative Cement Compressive Strengths after Water Addition

In the next experiments, quantitative measurements were made of compressive strengths of a Sorel cement composition using ethylene glycol, propylene glycol monomethyl ether, or a 1:1 mixture of the two as the solvent systems for dissolving magnesium chloride. In these experiments, no filler was included. Ten grams of magnesium chloride hydrate flakes was dissolved in 25 ml of the solvent by magnetically stirring for about 10 to 15 minutes. Magnesium oxide (17 grams) was stirred and mixed thoroughly and the slurry was poured into a brass cylinder mold of 40 ml capacity, and dimensions of 1 inch (ID)×3 inch (Length). Water (14 ml) was added and stirred with a spatula. The mixtures were allowed to stand at room temperature for 24 hours at which time clear supernatant fluid (14 ml) in each case was poured out, and the cylinders were capped and cured in the oven at 140° F. for 5 days. The uneven top portions were polished and the compressive strengths measured. The results are presented in Table 3.

TABLE 3

|  | Ethylene glycol | Propylene glycol monomethyl ether | Ethylene glycol + Propylene glycol monomethyl ether |
|---|---|---|---|
| Non-aqueous slurry density (lb/gal) | 12.6 | 11.6 | 12.1 |
| Set Cement Density | 12.8 | 12.8 | 12.8 |
| Compressive Strength (psi) | 430 | 385 | 480 |

The above results demonstrate that upon exposure to water, the non-aqueous fluids of magnesium chloride flakes and magnesium oxide will set and develop good strengths. The separation of clear organic fluid from the slurries upon addition of water and the uniformity of compressive strengths for the set compositions indicate that the less-polar solvents (for example, diesel) may have become displaced or phase separated. Without being limited by any theory, this is believed to be due to insolubility of the less-polar solvent in aqueous magnesium chloride brine, the preferential dissolution of magnesium chloride in water, and that the non-aqueous fluid does not become part of the set cement.

Method Steps

A well fluid according to the invention can be prepared at the job site, prepared at a plant or facility prior to use, or certain components of the well fluid can be pre-mixed prior to use and then transported to the job site. Certain components of the well fluid may be provided as a "dry mix" to be combined with fluid or other components prior to or during introducing the well fluid into the well.

In certain embodiments, the preparation of a well fluid can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

It should be understood that the step of introducing a well fluid into a well can advantageously include the use of one or more fluid pumps.

The components of the SCC may be combined using any mixing device compatible with the composition as known to one of ordinary skill in the art, for example a batch mixer or recirculating mixer.

The SCC may be placed into a wellbore as a single stream and activated by downhole conditions involving exposure to water to form a set rigid mass. In such an embodiment, the SCC may be placed downhole through the drill bit forming a composition that substantially eliminates lost circulation. In yet another embodiment, the SCC is formed downhole by the mixing of a first stream comprising one or more SCC components such as for example MgO and chloride or phosphate salt and a second stream comprising additional SCC components. Alternatively, the SCC may be formed downhole by the mixing of a first stream comprising MgO and a second stream comprising the chloride or phosphate salt, surfactant and optional additives. Examples of methods for introducing compositions into a wellbore to seal subterranean zones are described in U.S. Pat. Nos. 5,913,364; 6,167,967; and 6,258,757, each of which is incorporated by reference herein in its entirety.

The SCCs of this disclosure may develop an appreciable compressive strength when placed downhole. In an embodiment, the SCC may develop a compressive strength of from about 50 psi to about 20,000 psi, alternatively from about 100 psi to about 10,000 psi, alternatively from about 1000 psi to about 10,000 psi. The compressive strength of the SCC may develop in from about 15 minutes to equal to or greater than about 24 hours, alternatively from about 20 minutes to about 10 hours, alternatively from about 30 minutes to about 8 hours.

The SCC may have a density from about 4 lb/gallon (ppg) to about 25 ppg, alternatively from about 12 ppg to about 17 ppg, alternatively from about 6 ppg to about 14 ppg by any of the methods known to those skilled in the art, for example addition of hollow light weight glass beads, gas phase, or high density solids and the like. Density reducing additives such as glass beads or foam and expanding additives such as gas, suspension aids, foamers, and the like may be included in the SCC to generate a lightweight cement slurry. Amounts of such density-reducing additives and methods for their inclusion are known to one of ordinary skill in the art. Adjusting the SCC density by controlling water to cement ratio is a less desirable technique, as is typically the case for non-hydraulic cements.

The SCC disclosed herein may be used as a well fluid, such as a cementing or treatment fluid. Without limitation, servicing the wellbore includes positioning the SCC in the wellbore to isolate the subterranean formation from a portion of the wellbore; to support a conduit in the wellbore; to plug a void or crack in the conduit; to plug a void or crack in a cement sheath disposed in an annulus of the wellbore; to plug an opening between the cement sheath and the conduit; to prevent the loss of aqueous or non-aqueous drilling fluids into loss circulation zones such as a void, vugular zone, or fracture; to be used as a fluid in front of cement slurry in cementing operations; to seal an annulus between the wellbore and an expandable pipe or pipe string; or combinations thereof.

In an embodiment, the SCC may be introduced to the wellbore to prevent the loss of aqueous or non-aqueous drilling fluids into loss-circulation zones such as voids, vugular zones, and natural or induced fractures while drilling. The SCC may form a non-flowing, intact mass inside the loss-circulation zone which plugs the zone and inhibits loss of subsequently pumped drilling fluid, which allows for further drilling. For example, the SCC may function as a plug that is placed into an annulus of the wellbore and prepares the formation for placement of a second (e.g., cementitious) composition.

Alternatively, the SCC when placed in a wellbore may be allowed to set such that it isolates the subterranean formation from a different portion of the wellbore. The SCC thus forms a barrier that prevents fluids in that subterranean formation from migrating into other subterranean formations. In an embodiment, the wellbore in which the composition is positioned belongs to a multilateral wellbore configuration. It is to be understood that a multilateral wellbore configuration includes at least two principal wellbores connected by one or more ancillary wellbores.

In an embodiment, the SCC may be used for plug and abandonment of a well, i.e. to prepare a well to be shut in and permanently isolated. A series of plugs comprising the SCC may be set in the wellbore and tested at each stage for hydraulic isolation.

In an embodiment, the SCC may serve as a spot fluid. A spot fluid herein refers to a small volume or pill of fluid placed in a wellbore annulus that may displace another wellbore servicing fluid such as for example a mud. The spot fluid may act as a settable fluid that when used will displace another wellbore servicing fluid from a crack or crevice in the wellbore and solidify to prevent flow of other wellbore servicing fluids into said cracks or crevices.

Preferably, after any such well treatment, a step of producing hydrocarbon from the subterranean formation is the desirable objective.

Conclusion

Therefore, the present invention is well adapted to attain the ends and advantages mentioned as well as those that are inherent therein.

The particular embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope and spirit of the present invention.

The various elements or steps according to the disclosed elements or steps can be combined advantageously or practiced together in various combinations or sub-combinations of elements or sequences of steps to increase the efficiency and benefits that can be obtained from the invention.

The invention illustratively disclosed herein suitably may be practiced in the absence of any element or step that is not specifically disclosed or claimed.

Furthermore, no limitations are intended to the details of construction, composition, design, or steps herein shown, other than as described in the claims.

What is claimed is:

1. A method of treating a well, the method comprising the steps of:
   (A) forming a non-hydraulic cement composition comprising:
      (i) a non-aqueous liquid phase comprising one or more organic compounds characterized by:

(a) having at least one hydroxyl group on a carbon atom,
(b) being a liquid when pure under Standard Laboratory Conditions, and
(c) being at least soluble in water;
(ii) one or more magnesium chloride compounds selected from the group consisting of: magnesium chloride, a magnesium chloride hydrate, and any combination thereof; and
(iii) magnesium oxide;
wherein the one or more organic compounds comprises at least 40% by weight of the non-aqueous liquid phase excluding the weight of any dissolved solids; and
(B) introducing the non-hydraulic cement composition into the well.

2. The method according to claim 1, wherein:
the one or more magnesium chloride compounds are dissolved in the non-aqueous phase at a concentration of at least 50 g/l based on the volume of the one or more organic compounds in the liquid phase; and
the ratio of the magnesium oxide to the magnesium chloride compounds is at least 1.0 magnesium oxide: 1 magnesium chloride compounds by weight.

3. The method according to claim 1, wherein the one or more organic compounds are additionally characterized by dissolving magnesium chloride to at least 100 g/l under Standard Laboratory Conditions.

4. The method according to claim 1, wherein the non-aqueous liquid phase comprises less than 1% water by weight excluding the weight of any dissolved solids.

5. The method according to claim 1, wherein the non-aqueous liquid phase is essentially dry.

6. The method according to claim 1, wherein the non-aqueous liquid phase is the continuous phase of the non-hydraulic cement composition.

7. The method according to claim 6, wherein the non-hydraulic cement composition is not an emulsion with an aqueous phase.

8. The method according to claim 1, wherein the one or more organic compounds are not surfactants.

9. The method according to claim 1, wherein the non-aqueous liquid phase comprises less than 0.1% of surfactants by weight based on the combined weight of magnesium chloride compounds and magnesium oxide.

10. The method according to claim 1, wherein the non-hydraulic cement composition comprises less than 1% hydraulic cement by weight based on the by combined weight of magnesium chloride compounds and magnesium oxide.

11. The method according to claim 1, wherein the step of introducing further comprises directing or allowing the non-hydraulic cement composition to meet with an aqueous fluid, thereby causing the one or more magnesium chloride compounds and the magnesium oxide to mix with water and set.

12. A method of treating a well, the method comprising the steps of:
(A) forming a non-hydraulic cement composition comprising:
(i) a non-aqueous liquid phase comprising one or more organic compounds characterized by:
(a) having at least one hydroxyl group on a carbon atom,
(b) being a liquid when pure under Standard Laboratory Conditions, and
(c) being at least soluble in water;
(ii) one or more magnesium chloride compounds selected from the group consisting of: magnesium chloride, a magnesium chloride hydrate, and any combination thereof; and
(iii) magnesium oxide;
wherein the one or more organic compounds comprises at least 40% by weight of the non-aqueous liquid phase excluding the weight of any dissolved solids;
wherein the one or more magnesium chloride compounds are dissolved in the non-aqueous liquid phase; and
(B) introducing the non-hydraulic cement composition into the well.

* * * * *